United States Patent [19]
Olszewski et al.

[11] Patent Number: 6,099,003
[45] Date of Patent: Aug. 8, 2000

[54] STEERING KNUCKLE

[75] Inventors: Egon Olszewski, Paderborn; Leonhard Rose, Borchen/Alfen; Wolfgang Streubel, Detmold, all of Germany

[73] Assignee: Bentler AG, Paderborn, Germany

[21] Appl. No.: 09/172,832

[22] Filed: Oct. 15, 1998

[30] Foreign Application Priority Data

Oct. 18, 1997 [DE] Germany .................. 297 18 557 U

[51] Int. Cl.[7] .................................................. B60G 1/00
[52] U.S. Cl. .............................. 280/93.512; 280/124.125
[58] Field of Search ...................... 280/93.512, 124.125, 280/124.135, 124.136, 124.143

[56] References Cited

U.S. PATENT DOCUMENTS

| | | | |
|---|---|---|---|
| 4,440,420 | 4/1984 | Muller | 280/124.135 |
| 4,635,957 | 1/1987 | Merkle | 280/93.512 |
| 4,842,296 | 6/1989 | Kubo | 280/124.136 |
| 5,199,730 | 4/1993 | Westfall et al. | 280/93.512 |
| 5,366,233 | 11/1994 | Kozyra et al. | 280/93.512 |
| 5,829,768 | 11/1998 | Kaneko et al. | 280/93.512 |
| 5,868,409 | 2/1999 | Breuer | 280/124.125 |

*Primary Examiner*—Lanna Mai
*Assistant Examiner*—Elaine Gort
*Attorney, Agent, or Firm*—Friedrich Kueffner

[57] ABSTRACT

A steering knuckle of aluminum or an aluminum alloy for a wheel suspension on a front axle of a motor vehicle, designed as a one-piece forging which has a wheel-bearing socket (2), that is wider than it is thick, with a through hole (3) designed to accept a screw-in bearing flange. The steering knuckle has a radius arm connection bracket (20) and a carrier arm connection bracket (21), offset with respect to each other, formed on an end surface of the wheel-bearing socket (2). A web-shaped brake caliper connecting section (25) is formed on a first side of the wheel-bearing socket (2). A neck (7), which is designed as a solid section with an arc-shaped contour in the longitudinal direction, extends from the wheel-bearing socket (2). A free end surface (11) of the neck is provided with connection structures (13, 13') for transverse links, and a trackrod arm (15) projecting to the first side. The trackrod arm has an outward-tapering, rectangular central section (16) and a trackrod arm connection structure (17) at one end.

5 Claims, 1 Drawing Sheet

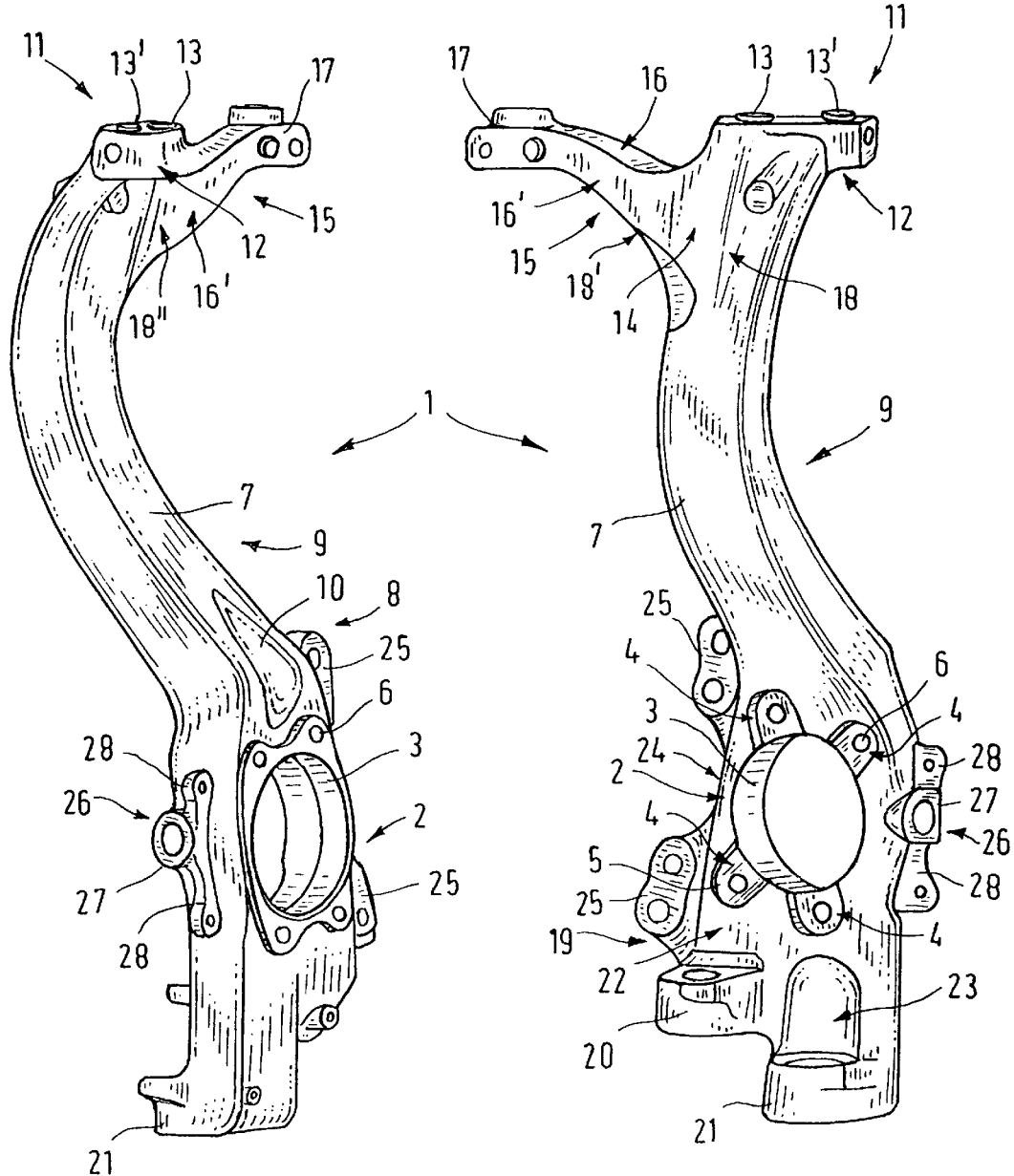

STEERING KNUCKLE

BACKGROUND OF THE INVENTION

1. Field of the Invention

The present invention pertains to a steering knuckle of aluminum or an aluminum alloy for the wheel suspension at the front axle of a motor vehicle.

2. Description of Related Art

The wheel suspension of the front axle must allow not only vertical movement for spring deflection and rebound but also the pivoting movement of the two wheels for steering the vehicle. It is the steering knuckle which makes it possible for the wheel to pivot. In many cases, the steering knuckle is therefore also referred to as a pivot bearing.

In addition to transferring the steering motion to the wheel, the steering knuckle must also absorb the forces and moments acting on the wheel and transmit them to the transverse links and the steering tie rod.

Steering knuckles must meet very strict requirements with respect to their strength and load-bearing behavior. Because they are subjected under certain conditions to extreme static and dynamic operating loads, they must meet high safety standards. So far, steering knuckles have been designed as steel castings or steel forgings. This means that the component is quite heavy for its size. This contributes to an increase in the total weight of the motor vehicle and to an increase in the unsprung weight, which has a disadvantageous effect on the dynamic driving properties.

For economic and environmental reasons, the automobile industry is trying to build lighter-weight motor vehicles. Decreasing the weight of the vehicle makes it possible to reduce the amount of material required to build it; it also reduces fuel consumption and the emission of pollutants.

SUMMARY OF THE INVENTION

The invention is therefore based on the task of reducing the weight of the steering knuckle without affecting its ability to meet the relevant safety requirements while improving its load-bearing behavior at the same time.

The central idea of the invention is to design the steering knuckle as a one-piece forging of aluminum.

As a result, the knuckle weighs much less than a comparable steel component. This leads simultaneously to a reduction in the unsprung weight, as a result of which the dynamic driving properties are improved.

The steering knuckle is manufactured as a one-piece forging. It has a wheel-bearing socket, wider than it is thick, with a through-hole, which is designed to accept a screw-on bearing flange. A bracket-like radius arm connection and a bracket-like carrier arm connection are formed, opposite each other, on the end surface of the wheel-bearing socket. A connection point for the brake caliper is provided on the side. This has the form of a web. The positions of the radius arm connection, the carrier arm connection, and the caliper connection point can be adjusted to suit the type of vehicle and the geometric installation conditions in question.

Extending out from the area of the wheel-bearing socket is the neck of the knuckle, which is made of solid material and which curves in the form of an arc in its lengthwise direction. The connections for the transverse links are at one end, on the free end surface of the neck. Projecting out toward the side is a trackrod arm. This has a rectangular central section which tapers down as it proceeds outward and has a trackrod arm connection at the end.

The steering knuckle becomes thinner as it proceeds from the wheel-bearing socket to the neck. The transitions from the wheel-bearing socket to the neck and the transition from the neck to the trackrod arm are smooth and continuous; overall, the component has rounded longitudinal edges. This helps counteract the notch effect under dynamic load.

As a whole, therefore, the steering knuckle is optimized with respect to stiffness at the same time that its weight is reduced.

Another weight optimization is achieved in that, at the transition from the wheel-bearing socket to the convex side of the neck, a trough is formed, one end of which runs out in the neck, the other end in area of the wheel-bearing socket. Thus, the amount of material required is reduced by adapting the configuration of the component to the loads which occur under operating conditions.

Thus a steering knuckle is created which has a load-bearing behavior capable of satisfying the operating requirements but which also weighs much less than a conventional knuckle.

So that a wheel bearing can be screwed into the wheel-bearing socket in such a way that it is accurately positioned and held reliably in place, recesses are arranged radially around the through-hole. The abutting sections of the bearing flange of the wheel bearing engage in the recesses. The wheel bearing is held in place by threaded bolts. For this purpose, threaded holes are provided, which open out into the bottom of the recesses.

The screw-on connection of the wheel bearings makes assembly and disassembly much easier.

In an advisable elaboration, a bracket for accepting an ABS sensor is provided on the narrow side of the wheel-bearing socket, opposite the brake caliper connecting point. For the installation of a brake shield plate, screw-in points are provided next to this bracket in the longitudinal direction of the wheel-bearing socket.

For practical reasons, it is also considered advantageous to provide a trough-like depression in the wheel-bearing socket between the carrier arm connection and the through-hole. The depression facilitates the insertion of a connecting bolt and the installation of the carrier arm.

In addition, this depression also ensures a sufficient degree of freedom for the pivoting motion of the steering knuckle relative to the carrier arm. The dimensions and design of the depression are designed in correspondence with the loads to be expected on the basis of the operating factors and under consideration of the desired weight reduction.

The invention is described below on the basis of an exemplary embodiment, which is illustrated in the drawings:

BRIEF DESCRIPTION OF THE DRAWINGS

FIGS. 1 and 2 show a steering knuckle 1 in two different perspective views.

DESCRIPTION OF THE PREFERRED EMBODIMENTS

Steering knuckle 1 is a one-piece aluminum forging. As a component of the wheel suspension on the front axle of a motor vehicle, it absorbs the forces and moments acting on the wheel and conducts them to the transverse links and the steering tie rod. In addition, steering knuckle 1 also transmits the steering motion to the wheel.

Steering knuckle 1 has a wheel-bearing socket 2 with a through-hole 3. Wheel bearing socket 2 is wider than it is thick.

A wheel bearing can be positioned in through-hole 3 and fixed in position by way of its bearing flange in wheel-bearing socket 2. For this purpose, four recesses 4 are arranged radially around through-hole 3. Recesses 4 are open toward through-hole 3. In the center of bottom 5 of each recess 4, a threaded hole 6 is provided. In this way, a flange bearing can be screwed into wheel-bearing socket 2. The use of a screw-in flange bearing makes assembly and disassembly easier than it would be for a press-fit bearing.

A neck section 7, which forms an arc in its longitudinal direction, extends out from wheel-bearing socket 2. Neck 7 has a solid, full cross section.

At transition 8 from wheel-bearing socket 2 to convex side 9 of neck 7, a trough 10 is provided. One end of this trough runs out in neck 7, and the other end runs out in the direction of wheel-bearing socket 2. As a result of this design, an effective reduction in the amount of material required is achieved while guaranteeing the section modulus and stiffness behavior required for operation.

At transition 8, wheel-bearing socket 2 tapers down toward neck 7.

At its free end surface 11, neck 7 has a connecting section 12, on which two connections 13, 13' are formed for the attachment of the transverse links of the wheel suspension. Connections 13, 13' are offset with respect to each other. Connection 13' is located in the part of connecting section 12 which projects laterally beyond the contour of neck 7. Neck 7 is reinforced by a node section 14 leading towards connection 13.

Projecting out toward the side, a trackrod arm 15 is formed on neck 7. This has an outward-tapering, rectangular central section 16 with flat side surfaces 16'. At the end, a trackrod arm connection 17 is formed.

Transitions 18, 18', 18" from neck 7 to node section 14 and trackrod arm 15 are smoothly rounded.

On side 19 of wheel-bearing socket 2 opposite neck 7, a radius arm connection 20 and a carrier arm connection 21 are formed. Radius arm connection 20 and carrier arm connection 21 are offset with respect to each other and project like brackets from the end surface of flange connection side 22 of wheel-bearing socket 2.

Between carrier arm connection 21 and through-hole 3, a trough-like depression 23 is formed in wheel-bearing socket 2. Depression 23 has a half-round contour. Depression 23 facilitates the introduction of a connecting bolt during the installation of the carrier arm and ensures sufficient freedom of movement of the head of the bolt after assembly.

On the narrow side 24 of wheel-bearing socket 2 there are two web-like stop sections 25 for the brake caliper connecting point. On the opposite narrow side 26 of wheel-bearing socket 2 there is a bracket 27, which serves to receive an ABS sensor. In the longitudinal direction of wheel-bearing socket 2, screw-in points 28 with threads are provided next to bracket 27. These serve to accept a brake shield plate, which protects the brake against the frictional heat that radiates off the brake disk during braking operations.

Steering knuckle 1 is manufactured as a one-piece forging of aluminum or an aluminum alloy. As a result, it is possible to use a light-weight construction method which is associated with a considerable reduction in weight in comparison to a design based on the use of steel. This leads to a reduction in the unsprung weight. The rigidity of steering knuckle 1 is optimized by its contour at the same time that its weight is reduced. All this serves to improve the dynamic driving behavior of the motor vehicle.

List of Reference Numbers 1 steering knuckle
2 wheel-bearing socket
3 through-hole -continued List of Reference Numbers 4 recess
5 bottom of 4
6 through-holes for threaded bolts
7 neck of the knuckle
8 transition
9 convex side of 7
10 trough
11 free end surface of 7
12 connecting section
13 connection
13' connection
14 node section
15 trackrod arm
16 central section
16' side surfaces of 16
17 trackrod arm connection
18 transition
18' transition
18" transition
19 side
20 radius arm connection
21 carrier arm connection
22 flange connection side
23 depression
24 narrow side
25 stop section
26 narrow side
27 bracket
28 screw-in points for brake shield plate

What is claimed is:

1. Steering knuckle of aluminum or an aluminum alloy for the wheel suspension on the front axle of a motor vehicle, designed as a one-piece forging which has a wheel-bearing socket (2), wider than it is thick, with a through hole (3) which is designed to accept a screw-in bearing flange, where a radius arm connection bracket (20) and a carrier arm connection bracket (21), offset with respect to each other, are formed on the an end surface of the wheel-bearing socket (2); where a web-shaped brake caliper connecting section (25) is formed on a first side (24) of the wheel-bearing socket; and where a neck (7), which is designed as a solid section with an arc-shaped contour in the longitudinal direction, extends from the wheel-bearing socket (2) to a free end surface (11) of the neck provided with connection structured (13, 13') for transverse links, and on which a trackrod arm (15) projecting to the first side is formed, which has an outward-tapering, rectangular central section (16) and a trackrod arm connection structure (17) at one end.

2. Steering knuckle according to claim 1, characterized in that a trough (10), running out in the neck (7) at one end and in the area of the wheel-bearing socket (2) at the other end is provided at a transition (8) between the wheel-bearing socket (2) and a convex side (8) of the neck (7).

3. Steering knuckle according to claim 1 or claim 2, characterized in that recesses (4), which are open toward the through-hole (3), are provided radially around the through-hole (3) of the wheel-bearing socket (2), bottoms of these recesses being provided with threaded holes (6) opening into the recesses (4).

4. Steering knuckle according to claim 1, characterized in that, on a second side (26) opposite the first side of the wheel-bearing socket (2), a bracket (27) for receiving an anti-lock braking system sensor is formed, next to which, in the longitudinal direction of wheel-bearing socket (2), are screw-in points (28) for brake shield plates.

5. Steering knuckle according to one of claims 1–4, characterized in that a depression (23) is formed in the wheel-bearing socket (2), between the carrier arm connection bracket (21) and the through-hole (3).

* * * * *